United States Patent
Zhou et al.

(10) Patent No.: US 12,316,925 B2
(45) Date of Patent: May 27, 2025

(54) DATA TRANSMISSION METHOD, TERMINAL DEVICE, AND COMPUTER-READABLE STORAGE MEDIUM

(71) Applicant: ATEL Technologies Co., Ltd., Shenzhen (CN)

(72) Inventors: Yulong Zhou, Shenzhen (CN); Song Wu, Shenzhen (CN); Zhengdong Jia, Shenzhen (CN)

(73) Assignee: ATEL Technologies Co., Ltd., Shenzhen (CN)

( * ) Notice: Subject to any disclaimer, the term of this patent is extended or adjusted under 35 U.S.C. 154(b) by 86 days.

(21) Appl. No.: 18/517,845

(22) Filed: Nov. 22, 2023

(65) Prior Publication Data

US 2024/0089557 A1    Mar. 14, 2024

Related U.S. Application Data

(63) Continuation of application No. PCT/CN2021/119022, filed on Sep. 17, 2021.

(51) Int. Cl.
  *H04N 21/6336* (2011.01)
  *H04N 21/233* (2011.01)
  *H04N 21/2343* (2011.01)

(52) U.S. Cl.
  CPC ..... *H04N 21/6336* (2013.01); *H04N 21/2335* (2013.01); *H04N 21/2343* (2013.01)

(58) Field of Classification Search
  None
  See application file for complete search history.

(56) References Cited

U.S. PATENT DOCUMENTS

| 4,698,629 A | 10/1987 | Mori et al. |
| 2008/0195761 A1* | 8/2008 | Jabri ............ H04N 19/10 709/250 |

FOREIGN PATENT DOCUMENTS

| CN | 108260010 A | 7/2018 |
| CN | 109089163 A | 12/2018 |
| CN | 109788254 A | 5/2019 |
| CN | 210327799 U | 4/2020 |

OTHER PUBLICATIONS

International search report, International Application No. PCT/CN2021/119022, mailed Jun. 14, 2022 (12 pages).

* cited by examiner

*Primary Examiner* — Clifford Hilaire

(57) ABSTRACT

A data transmission method is applied to a decoding end of a network audio and video matrix system, and the decoding end is in communication connection with an encoding end and several secondary decoding ends. The data transmission method comprises: acquiring request data signaling from a secondary decoding end, wherein the request data signaling comprises a distribution data signaling receiving address of the secondary decoding end; determining whether a currently occupied distribution capability value reaches a maximum distribution capability value; and if yes, sending a secondary distribution device table to the secondary decoding end, such that the secondary decoding end sends the request data signaling to other secondary decoding ends in the secondary distribution device table, and after the sending of the secondary distribution device table is completed, disconnecting a network connection with the secondary decoding end.

15 Claims, 4 Drawing Sheets

DATA TRANSMISSION METHOD, TERMINAL DEVICE, AND COMPUTER-READABLE STORAGE MEDIUM

CROSS REFERENCE TO RELATED APPLICATIONS

The present application is a continuation application of the international patent application No. PCT/CN2021/119022, filed on Sep. 17, 2021, the contents of which are incorporated herein by its entireties.

TECHNICAL FIELD

The present disclosure relates to the field of network audio and video transmission, and in particular to a data transmission method, a terminal device, and a computer-readable storage medium.

BACKGROUND

A network audio/video matrix system has a simple structure and may be used easily. Therefore, the network audio/video matrix system has been increasingly widely used.

The network audio/video matrix system usually includes a plurality of encoding terminals connected to an audio/video source and a plurality of decoding terminals connected to an audio/video reproducing device. The encoding terminals and decoding terminals are connected with each other via Ethernet. Audio/video data of any encoding terminal may be transmitted, through the Ethernet, to any decoding terminal, and the decoding terminal may receive and decode the audio/video data and output decoded data. Data distribution and data source switching are two main problems that need to be solved by the network audio/video matrix system.

The method that the encoding terminal distributes data to the plurality of decoding terminals requires the encoding terminal to have a high data distribution capability. In this case, the encoding terminal is required to have a processor having high data processing capabilities, have a network interface having high throughput, and so on. Demands of matrix applications in which a larger number of decoding terminals output program sources with the same encoding terminal cannot be met. In order to perform a method of distributing data to the plurality of decoding terminals through a distribution server, a special distribution server needs to be added to the system. In this way, construction and usage costs of the system is increased, and the system is more complex. In addition, since the distribution server itself have a limited distribution capacity, limitation in the number of transmitters and receivers in the system may not be solved.

SUMMARY OF THE DISCLOSURE

The present disclosure provides a data transmission method, a terminal device, and a computer-readable storage medium.

To solve the above technical problem, the present disclosure provides a data transmission method, performed by a decoding terminal in a network audio/video matrix system, wherein the decoding terminal has network connection with to an encoding terminal and a plurality of secondary decoding terminals, and the data transmission method includes:
obtaining, by the decoding terminal, a request data signaling sent from at least one of the plurality of secondary decoding terminals, wherein the request data signaling comprises a receiving address of a distribution data signaling of the at least one of the plurality of secondary decoding terminals;
determining, by the decoding terminal, whether a currently-occupied distribution capacity value reaches a maximum distribution capacity value; and
sending, by the decoding terminal, a secondary distribution device table to the at least one of the plurality of secondary decoding terminals, in response to the currently-occupied distribution capacity value reaching the maximum distribution capacity value, to enable the at least one of the plurality of secondary decoding terminals to send the request data signaling to other secondary decoding terminals in the secondary distribution device table; and disconnecting, after sending the secondary distribution device table, the network connection with the plurality of secondary decoding terminals.

In some embodiments, the method further includes:
maintaining, by the decoding terminal, the network connection with the plurality of secondary decoding terminals, in response to the currently-occupied distribution capacity value not reaching the maximum distribution capacity value, and distributing audio/video data; and
adding, by the decoding terminal, the receiving address of the distribution data signaling of the at least one of the plurality of secondary decoding terminals to the secondary distribution device table.

After the obtaining a request data signaling sent from at least one of the plurality of secondary decoding terminal, the method further includes:
determining, by the decoding terminal, whether the decoding terminal is currently in a state of being about to terminate a distribution service;
disconnecting, by the decoding terminal, the network connection with the plurality of secondary decoding terminals, in response to the decoding terminal being currently in the state of being about to terminate the distribution service; and
determining, by the decoding terminal, whether the currently-occupied distribution capacity value reaches the maximum distribution capacity value, in response to the decoding terminal being not in the state of being about to terminate the distribution service.

In some embodiments, the method further includes:
obtaining, by the decoding terminal, a signaling of requesting to terminate data distribution sent from the at least one of the plurality of secondary decoding terminals;
searching, by the decoding terminal in the secondary distribution device table, the receiving address of the distribution data signaling of the at least one of the plurality of secondary decoding terminals; deleting, by the decoding terminal, the found receiving address from the secondary distribution device table; and
stopping, by the decoding terminal, distributing the audio/video data to the at least one of the plurality of secondary decoding terminals and disconnecting the network connection with the plurality of secondary decoding terminals.

In some embodiments, the method further includes:
obtaining, by the decoding terminal, a source switching signaling and obtaining a data request address of another encoding terminal from the source switching signaling;

sending, by the decoding terminal, a signaling of changing distribution device to all secondary decoding terminals in the secondary distribution device table to enable all the secondary decoding terminals to switch a decoding terminal that distributes the audio/video data;

sending, by the decoding terminal, a signaling of terminating data connection to the encoding terminal that is currently connected to the decoding terminal; and disconnecting network connection with the encoding terminal;

sending, by the decoding terminal, the request data signaling to the another encoding terminal based on the data request address of the another encoding terminal to receive the audio/video data from the another encoding terminal.

In some embodiments, the method further includes:

sending the request data signaling to the another encoding terminal based on the data request address of the another encoding terminal;

determining whether an answer from the another encoding terminal is an answer of data being requested successfully;

maintaining, in response to the answer from the another encoding terminal being that the data is requested successfully, network connection with the another encoding terminal and starting receiving the audio/video data sent from the another encoding terminal;

obtaining, in response to the answer from the another encoding terminal being not that the data is requested successfully, a receiving address of a distribution data signaling of an available decoding terminal from the answer sent from the another encoding terminal; and sending the request data signaling to the available decoding terminal based on the receiving address of the distribution data signaling.

In some embodiments, the method further includes:

obtaining audio/video data from the encoding terminal and obtaining another audio/video data from the another encoding terminal;

determining whether time of the audio/video data is aligned with time of the another audio/video data;

sending, in response to the time of the audio/video data being aligned with the time of the another audio/video data, the signaling of terminating data connection to the encoding terminal and disconnecting data distribution network connection with the encoding terminal; and receiving the audio/video data from the another encoding terminal.

To solve the above technical problem, the present disclosure provides a data transmission method, applied to a network audio/video matrix system. The network audio/video matrix system includes an encoding terminal, a plurality of first decoding terminals and a plurality of second decoding terminals that are communicatively connected to each other; and the data transmission method includes:

sending, by at least one of the plurality of second decoding terminals, a request data signaling to at least one of the plurality of first decoding terminals, wherein the request data signaling comprises a receiving address of a distribution data signaling of the at least one of the plurality of secondary decoding terminals;

determining, by the at least one of the plurality of first decoding terminals, whether a currently-occupied distribution capacity value reaches a maximum distribution capacity value;

sending, by the at least one of the plurality of first decoding terminals, a secondary distribution device table to the at least one of the plurality of secondary decoding terminals, in response to the currently-occupied distribution capacity value reaching the maximum distribution capacity value;

sending, by the at least one of the plurality of secondary decoding terminals, the request data signaling to other secondary decoding terminals in the secondary distribution device table;
and after sending the secondary distribution device table, disconnecting, by the plurality of first decoding terminals, network connection with the plurality of secondary decoding terminals.

To solve the above technical problem, the present disclosure provides a terminal device, including a processor and a memory connected to the processor. The memory stores program instructions; the processor is configured to execute the program instructions stored in the memory to perform: obtaining a request data signaling sent from a secondary decoding terminal, wherein the request data signaling comprises a receiving address of a distribution data signaling of the secondary decoding terminal;

determining whether a currently-occupied distribution capacity value reaches a maximum distribution capacity value; and sending a secondary distribution device table to the secondary decoding terminal, in response to the currently-occupied distribution capacity value reaching the maximum distribution capacity value, to enable the secondary decoding terminal to send the request data signaling to other secondary decoding terminals in the secondary distribution device table; and disconnecting, after sending the secondary distribution device table, network connection with the secondary decoding terminal.

To solve the above technical problem, the present disclosure provides a computer-readable storage medium, storing program instructions. The program instructions are configured to be implemented to perform: obtaining a request data signaling sent from a secondary decoding terminal, wherein the request data signaling comprises a receiving address of a distribution data signaling of the secondary decoding terminal;

determining whether a currently-occupied distribution capacity value reaches a maximum distribution capacity value; and sending a secondary distribution device table to the secondary decoding terminal, in response to the currently-occupied distribution capacity value reaching the maximum distribution capacity value, to enable the secondary decoding terminal to send the request data signaling to other secondary decoding terminals in the secondary distribution device table; and disconnecting, after sending the secondary distribution device table, network connection with the secondary decoding terminal.

For the data transmission method provided in the present disclosure, the decoding terminal obtains the request data signaling from the secondary decoding terminal. The request data signaling includes the receiving address of the distribution data signaling of the secondary decoding terminal. The decoding terminal determines whether the currently-occupied distribution capacity value reaches the maximum distribution capacity value. In response to the currently-occupied distribution capacity value reaching the maximum distribution capacity value, the decoding terminal transmits the secondary distribution device table to the secondary decoding terminal, enabling the secondary decoding terminal to transmit the request data signaling to other secondary decoding terminals included in the secondary distribution device table. After the secondary distribution device table is sent, the decoding terminal is disconnected from the secondary decoding terminal. In the present disclosure, data distribution is achieved through the decoding terminal, requirements for the distribution capacity of the encoding terminal are reduced, and the structure of the network audio/video matrix system is simplified.

BRIEF DESCRIPTION OF THE DRAWINGS

In order to more clearly illustrate the technical solutions in the embodiments of the present disclosure, the accompanying drawings for describing the embodiments will be introduced in brief in the following. Apparently, the accompanying drawings in the following description show only some of the embodiments of the present disclosure, and that any ordinary skilled person in the art may obtain other accompanying drawings based on the drawings without creative work.

DETAILED DESCRIPTION

Technical solutions in the embodiments of the present disclosure will be described clearly and completely in the following by referring to the accompanying drawings in the embodiments of the present disclosure. Apparently, the described embodiments show only a part of, but not all of, the embodiments of the present disclosure. Based on the embodiments in the present disclosure, all other embodiments obtained by any ordinary skilled person in the art without any creative work shall fall within the scope of the present disclosure.

The present disclosure will be described in detail below by referring to the accompanying drawings and embodiments.

Figure 1:
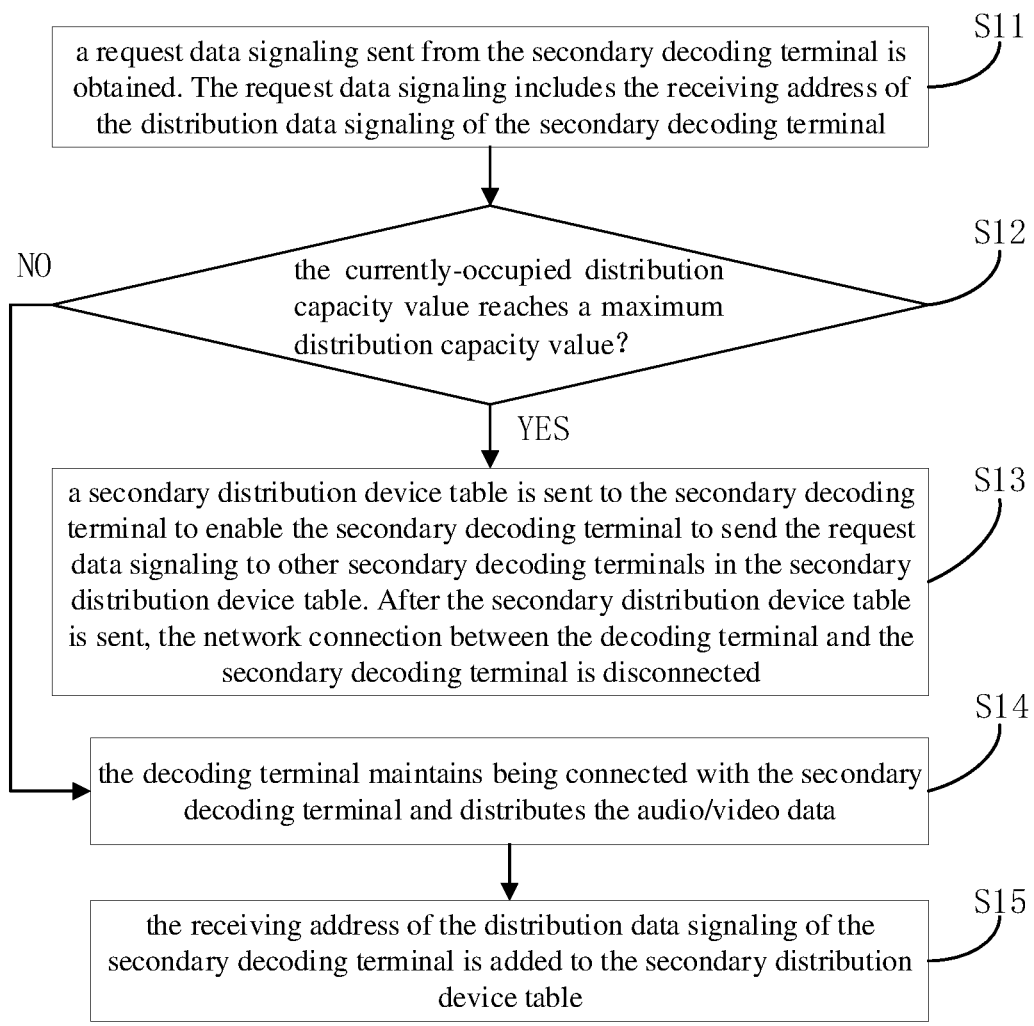
FIG. 1 is a flow chart of a data transmission method according to an embodiment of the present disclosure.

FIG. 1 is a flow chart of a data transmission method according to an embodiment of the present disclosure. The data transmission method described in the present embodiment is applicable to a TCP or UDP network unicast method to distribute audio/video data. In this way, requirements, which are for a network in which a network audio/video matrix system is located and are required by distributing data based on a multicast method, may be avoided, and adaptability of the network audio/video matrix system to the network may be improved.

The data transmission method of the present embodiment is applied to a decoding terminal in the network audio/video matrix system. Specifically, the network audio/video matrix system is a dynamic audio/video data distribution network formed by an encoding terminal and a plurality of decoding terminals. Data distribution is achieved by the distribution network. The dynamic distribution network does not require a special distribution server and requires the encoding terminal to have two paths as the minimum distribution capability. In this way, requirements for the distribution capability of the encoding terminal are prevented from being excessively high, a circuit at a transmitting terminal may be miniaturized, the structure of the system may be simplified, and the cost of the system may be reduced.

In detail, the network audio/video matrix system provided in the present embodiment may comprise M encoding terminals and N decoding terminals. Each of the M encoding terminals is connected to one to-be-input audio/video signal source. Each of the N decoding terminals is connected to one display device. All the encoding terminals are connected to all the decoding terminals via Ethernet and may perform TCP communication and UDP communication with the decoding terminals via the Ethernet.

To be noted that the decoding terminal in the present embodiment is a terminal device having a decoding capability, such as a decoder. The encoding end is a terminal device having an encoding capability, such as an encoder.

Each of the M encoding terminals collects, through the audio/video input interface, audio/video signals provided by the to-be-input audio/video signal source that is respectively connected to the encoding terminal. Further, the M encoding terminals encode the collected audio/video signals into M to-be-transmitted audio/video data. Any one of the N decoding terminals may obtain one of the M to-be-transmitted audio/video data via the Ethernet by performing the data transmission method provided by the present embodiments, decodes the to-be-transmitted audio/video data, and outputs the decoded data to the display device.

For example, IP addresses of the M encoding terminals in the Ethernet are IP_TX1, IP_TX2, . . . , and IP TXM; and IP addresses of the N decoding terminals in the Ethernet are IP_RX1, IP_RX2, . . . , and IP_RXN. Further, each of the M encoding terminals and the N decoding terminals has a program controller. The program controller is configured to implement, by executing programs, the data transmission method provided in the embodiments of the present disclosure.

To be noted that, the receiving address of the distribution data signaling, the data request address, and so on mentioned in the present disclosure are IP addresses of the terminal device.

When a relatively large number of decoding terminals need to obtain data from the same encoding terminal to allow the large number of decoding terminals to output a same audio/video source signaling, the encoding terminal directly distributes data to a limited number of decoding terminals. The decoding terminals that have obtain the audio/video data distributes the data to other decoding terminals that need to obtain the data. In this way, a data distribution network is established. In this way, one terminal device may be required to have a low distribution capacity, but an almost unlimited system distribution capacity may be achieved. In addition, the data distribution network is established by a special data request process initiated by the decoding terminal. The data request process does not need to pre-specify a sequence of the decoding terminals requesting data. Therefore, the distribution network is a dynamic distribution network. In the dynamic distribution network, one encoding terminal serves as a primary distribution device of the dynamic distribution network, and decoding terminals serve as secondary data distribution devices, and the secondary distribution devices are not fixed.

For the network audio/video matrix system including the M encoding terminals and the N decoding terminals described in the present embodiment, all terminal devices included in the system are classified into at most M device sets. Each of the M device sets includes one encoding terminal and a plurality of decoding terminals. The M device sets do not intersect with each other. Further, each of the M device sets may form one distribution network, and in the distribution network, the encoding terminal included in the device set serves as the primary data distribution device, and the other decoding terminals serve as the secondary distribution devices. In the distribution network, data distributed by each of the distribution devices eventually comes directly or indirectly from the primary data distribution device. In other words, the M device sets may form up to M encoding-terminal distribution networks. The M encoding-terminal distribution networks are formed in a same manner. However, each of the M encoding-terminal distribution networks distributes to-be-distributed data generated by the encoding terminal, which serves as the primary data distribution device in the instant distribution network.

In detail, the encoding terminal has a data distribution program module. The decoding terminal has a data obtaining program module and a data distribution program module. Data distributed by the data distribution program module of the encoding terminal is the to-be-distributed audio/video data obtained by being encoded at the encoding terminal. Data distributed by the data distribution program module of the decoding terminal is the audio/video data that the decoding terminal obtains from the encoding terminal or other decoding terminals. That is, on the one hand, the decoding terminal, which obtains the data, decodes the obtained data and outputs the decoded data; and on the other hand, the decoding terminal, which obtains the data, distributes the obtained data to another decoding terminal through the data distribution program module of the decoding terminal.

The data distribution program module of the encoding terminal or the data distribution program module of the decoding terminal receives, by listening to receiving address of the distribution control signaling of the instant terminal device, a distribution control signaling sent from the decoding terminal and processes the received distribution control signaling. The distribution control signaling includes the request data signaling and a signaling of requesting to terminate data distribution. The data distribution program module can establish one-to-one network communication with the plurality of decoding terminals. The data distribution program module distributes the to-be-distributed audio/video data to the connected terminal through the established network communication and records the receiving address of the distribution control signaling of the connected terminal. The number of communicative connections that can be established by the data distribution program module is limited by the distribution capacity of the device in which the data distribution program module is located. An upper limit of the number of the established communicative connections indicates a maximum distribution capacity, and the maximum distribution capacity can be preset in the data distribution program module.

As shown in FIG. 1, the data transmission includes following operations.

In an operation S11, a request data signaling sent from the secondary decoding terminal is obtained. The request data signaling includes the receiving address of the distribution data signaling of the secondary decoding terminal.

In the present embodiment, the encoding terminal obtains the to-be-transmitted audio/video signal through the audio/video source, samples and encodes the to-be-transmitted audio/video signal, compresses the to-be-transmitted audio/video signal into the audio/video signal, and distributes the audio/video signal.

After receiving the audio/video data distributed by the encoding terminal, the decoding terminal distributes the audio/video data to another secondary decoding terminal. To be noted that the secondary decoding terminals refer to decoding terminals that receive the audio/video data distributed from a decoding terminal, instead of an encoding terminal. The secondary decoding terminals may also distribute the audio/video data to the other decoding terminals.

Specifically, the secondary decoding terminal transmits the request data signaling to the decoding terminal to request the decoding terminal to distribute the audio/video data. The request data signaling includes the receiving address of the distribution data signaling of the secondary decoding terminal. Since the distribution capacity of the decoding terminal is limited, the decoding terminal, after receiving the request data signaling from the secondary decoding terminal, needs to detect whether the remaining distribution capacity of the decoding terminal is sufficient to perform the task of distributing the audio/video data to the secondary decoding terminal.

In an operation S12, it is determined whether the currently-occupied distribution capacity value reaches a maximum distribution capacity value.

In the present embodiment, the decoding terminal determines whether the currently-occupied distribution capacity value of the decoding terminal reaches the maximum distribution capacity value that can be supported by the decoding terminal. In response to the currently-occupied distribution capacity value reaching the maximum distribution capacity value, the decoding terminal cannot perform the task of distributing the audio/video data to the secondary decoding terminal and performs an operation S13. In response to the currently-occupied distribution capacity value not reaching the maximum distribution capacity value, the decoding terminal may perform the task of distributing the audio/video data to the secondary decoding terminal and perform an operation S14.

Specifically, the decoding terminal may determine, by determining whether the number of currently-established distribution connections reaches the preset maximum number of distribution connections, whether the terminal device reaches the maximum distribution capacity.

Further, before detecting the remaining distribution capacity of the decoding terminal, the decoding terminal may firstly detect whether the decoding terminal is currently in a state of being about to terminate a distribution service. The decoding terminal, which is distributing audio/video data to another secondary decoding terminal, may distribute only audio/video data from a distribution device at a higher level of the decoding terminal. The higher-level distribution device may be a higher-level decoding terminal or a higher-level encoding terminal. When the decoding terminal is about to be disconnected from the higher-level distribution device, the decoding terminal enters the state of being about to terminate the distribution service. When the decoding terminal is in the state of being about to terminate the distribution service, the decoding terminal does not need to consider the remaining distribution capacity, directly rejects the request data signaling sent from the secondary decoding terminal, and disconnects from the secondary decoding terminal. When the decoding terminal is not about to be disconnected from the higher-level distribution device, the decoding terminal may detect whether the remaining distribution capacity of the decoding terminal is sufficient to perform the task of distributing the audio/video data to the secondary decoding terminal.

In an operation S13, a secondary distribution device table is sent to the secondary decoding terminal to enable the secondary decoding terminal to send the request data signaling to other secondary decoding terminals in the secondary distribution device table. After the secondary distribution device table is sent, the network connection between the decoding terminal and the secondary decoding terminal is disconnected.

In the present embodiment, when the decoding terminal is unable to perform the task of distributing the audio/video data to the secondary decoding terminal, the decoding terminal may provide the secondary distribution device table of the instant decoding terminal to the secondary decoding terminal. The secondary distribution device table records receiving addresses of the distribution control signaling of the other secondary decoding terminals that establish distribution connection with the decoding terminal. Each receiving address of the distribution control signaling may be formed by an IP address of a respective one secondary decoding terminal and a listening port of the distribution control signaling.

For the secondary decoding terminal, the secondary decoding terminal may send, based on the receiving addresses of the distribution control signaling in the table, the request data signaling to other secondary decoders in the secondary distribution device table to obtain audio/video data from other secondary decoding terminals. Since the audio/video data of all secondary decoding terminals in the secondary distribution device table come from the decoding terminals and the encoding terminals in the same distribution network, the audio/video data are ensured to have a same origin.

For the decoding terminal, after the decoding terminal finishes sending the secondary distribution device table, the decoding terminal may be disconnected from the secondary decoding terminals.

In an operation S14, the decoding terminal maintains being connected with the secondary decoding terminal and distributes the audio/video data.

In the present embodiment, when the decoding terminal can perform the task of distributing the audio/video data to the secondary decoding terminal, the decoding terminal maintains the network connection with the secondary decoding terminal, and starts distributing the audio/video data through the distribution connection.

In an operation S15, the receiving address of the distribution data signaling of the secondary decoding terminal is added to the secondary distribution device table.

In the present embodiment, the decoding terminal further adds the receiving address of the distribution data signaling of the secondary decoding terminal into the secondary distribution device table. The secondary decoding terminal successfully establishes the distribution connection with the decoding terminal. The decoding terminal correspondingly increases the value of the currently-occupied distribution capacity. That is, the number of currently-established data distribution connections is increased by 1.

Further, when the decoding terminal receives the signaling of requesting to terminate data distribution sent from the secondary decoding terminal, the decoding terminal obtains a to-be-disconnected receiving address of distribution data signaling from the signaling of requesting to terminate data distribution; searches the receiving address of distribution data signaling of the secondary decoding terminal in the secondary distribution device table; and deletes the receiving address. Further, the decoding terminal stops distributing the audio/video data to the secondary decoding terminal and is disconnected from the secondary decoding terminal. Accordingly, the decoding terminal reduces the value of the currently-occupied distribution capacity, i.e., the number of the currently-established data distribution connections is reduced by 1.

In the present embodiment, the decoding terminal obtains the request data signaling from the secondary decoding terminal. The request data signaling includes the receiving address of the distribution data signaling of the secondary decoding terminal. The decoding terminal determines whether the currently-occupied distribution capacity value reaches the maximum distribution capacity value. In response to the currently-occupied distribution capacity value reaching the maximum distribution capacity value, the decoding terminal sends the secondary distribution device table to the secondary decoding terminal to enable the secondary decoding terminal to send the request data signaling to other secondary decoding terminals in the secondary distribution device table. After the secondary distribution device table is sent, the decoding terminal is disconnected from the secondary decoding terminal. In the present disclosure, data distribution is achieved through the decoding terminal, requirements for the distribution capacity of the encoding terminal are reduced, and the structure of the network audio/video matrix system is simplified.

Figure 2:
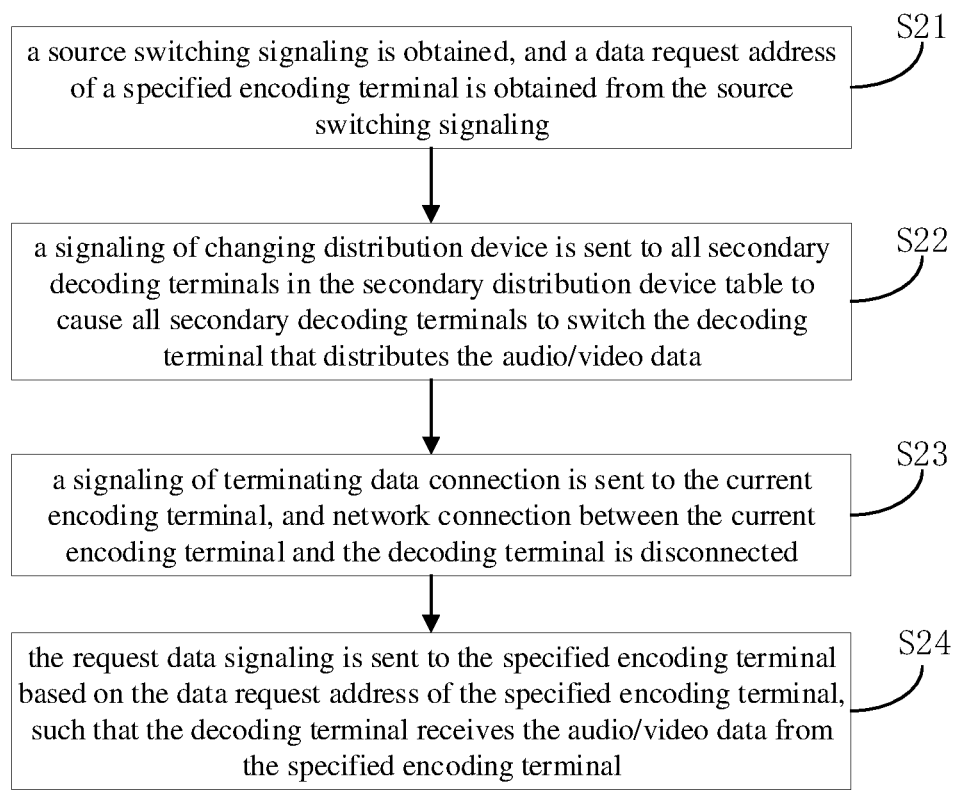
FIG. 2 is a flow chart of a data transmission method according to another embodiment of the present disclosure.

FIG. 2 is a flow chart of a data transmission method according to another embodiment of the present disclosure.

As shown in FIG. 2, the data transmission method includes the following operations.

In an operation S21, a source switching signaling is obtained, and a data request address of a specified encoding terminal is obtained from the source switching signaling.

In the present embodiment, when the decoding terminal receives the source switching signaling, the decoding terminal obtains an encoder, which is to be connected to a to-be-switched source, i.e., the data request address of the specified encoding terminal, and saves the obtained data request address of the specified encoding terminal. Further, the decoding terminal performs the following operations to switch the connected encoding terminal.

In an operation S22, a signaling of changing distribution device is sent to all secondary decoding terminals in the secondary distribution device table to cause all secondary decoding terminals to switch the decoding terminal that distributes the audio/video data.

In the present embodiment, the decoding terminal detects whether the secondary distribution device table of the instant terminal device includes the secondary decoding terminal. In response to the secondary distribution device table of the instant terminal device not including the secondary decoding terminal, the network connection of the current encoding terminal is disconnected, and a request data signaling is sent to the specified encoding terminal. In response to the secondary distribution device table of the instant terminal device including the secondary decoding terminal, the signaling of changing distribution device is sent to all secondary decoding terminals in the secondary distribution device table to enable all secondary decoding terminals to switch the decoding terminal that distributes the audio/video data, and that is, the distribution device is switched.

The decoding terminal that needs to switch the distribution network (i.e., the distribution network is about to not serve as the data source) may be distributing data to some other decoding terminals. In this case, when the distribution network, which the decoding terminal belongs to, is forced to be switched (forced to stop distributing data), audio/video data streams of devices in the distribution network may be temporarily interrupted, resulting in output signals of the secondary decoding terminal being loss and lagged. Therefore, the problems may be solved by switching the signal source of the decoding terminals.

In an operation S23, a signaling of terminating data connection is sent to the current encoding terminal, and network connection between the current encoding terminal and the decoding terminal is disconnected.

In the present embodiment, the decoding terminal waits for all the secondary decoding terminals, which have received the signaling of changing the distribution device, finish switching the distribution device, the decoding terminal sends the signaling of terminating data connection to the current decoding terminal and is disconnected from the current encoding terminal.

Further, after the decoding terminal sends the signaling of terminating data connection, the decoding terminal may not wait for the current encoding terminal answering the signaling of terminating data connection and may directly be disconnected from the current encoding terminal, such that time consumed for the decoding terminal to switch the source may be reduced effectively.

To be noted that the decoding terminal sends the signaling of terminating data connection to the higher-level distribution device. In the present embodiment, the higher-level distribution device may be the encoding terminal. In other embodiments, the higher-level distribution device may alternatively be another decoding terminal that distributes the audio/video data to the instant decoding terminal, i.e., a higher-level decoding terminal.

In an operation S24, the request data signaling is sent to the specified encoding terminal based on the data request address of the specified encoding terminal, such that the decoding terminal receives the audio/video data from the specified encoding terminal.

In the present embodiment, the decoding terminal, based on the data request address of the specified encoding terminal given by the source switching signaling, initiates the request data signaling to the specified encoding terminal to start a process of requesting the audio/video data.

In detail, the decoding terminal sends the request data signaling to the specified encoding terminal and waits for the specified encoding terminal to answer the request data signaling. Subsequently, the decoding terminal determines whether the answer from the specified encoding terminal is data being requested successfully. In response to the answer from the specified encoding terminal being that the data is requested successfully, the decoding terminal maintains being connected with the specified encoding terminal starts receiving the audio/video data sent from the specified encoding terminal. In response to the answer from the specified encoding terminal being not that the data is requested successfully, the decoding terminal obtains the receiving address of distribution data signaling of an available decoding terminal from the answer of the specified encoding terminal, sends the request data signaling to the available decoding terminal based on the receiving address of distribution data signaling, and waits for an answer for the signaling.

Further, since the decoding terminal re-establishes distribution data connection with the specified encoding terminal. A data path of the newly-established distribution data connection is different from a data path of the original distribution data connection. It is to be checked whether audio/video data obtained through the data path of the newly-established distribution data connection is aligned with audio/video data obtained through the data path of the original distribution data connection.

Specifically, the decoding terminal obtains the audio/video data from the original distribution data connection and the newly-established distribution data connection at the same time and caches the audio/video data from the two distribution data connections respectively. The decoding terminal compares time stamps in the audio/video data obtained through the data path of the newly-established distribution data connection to time stamps in the audio/video data obtained through the data path of the original distribution data connection. When the time stamps in the audio/video data obtained through the data path of the newly-established distribution data connection are included in the time stamps in the audio/video data obtained through the data path of the original distribution data connection, the audio/video data obtained through the data path of the newly-established distribution data connection is aligned with the audio/video data obtained through the data path of the original distribution data connection.

When the audio/video data obtained through the data path of the newly-established distribution data connection is aligned with the audio/video data obtained through the data path of the original distribution data connection, the decoding terminal may send the signaling of terminating data connection to the current encoding terminal and directly disconnects from the current encoding terminal without receiving any answer. Further, the decoding terminal receives the audio/video data from the specified encoding terminal. Specifically, the decoding terminal may start obtaining the audio/video data from the aligned audio/video data that is cached.

Figure 3:
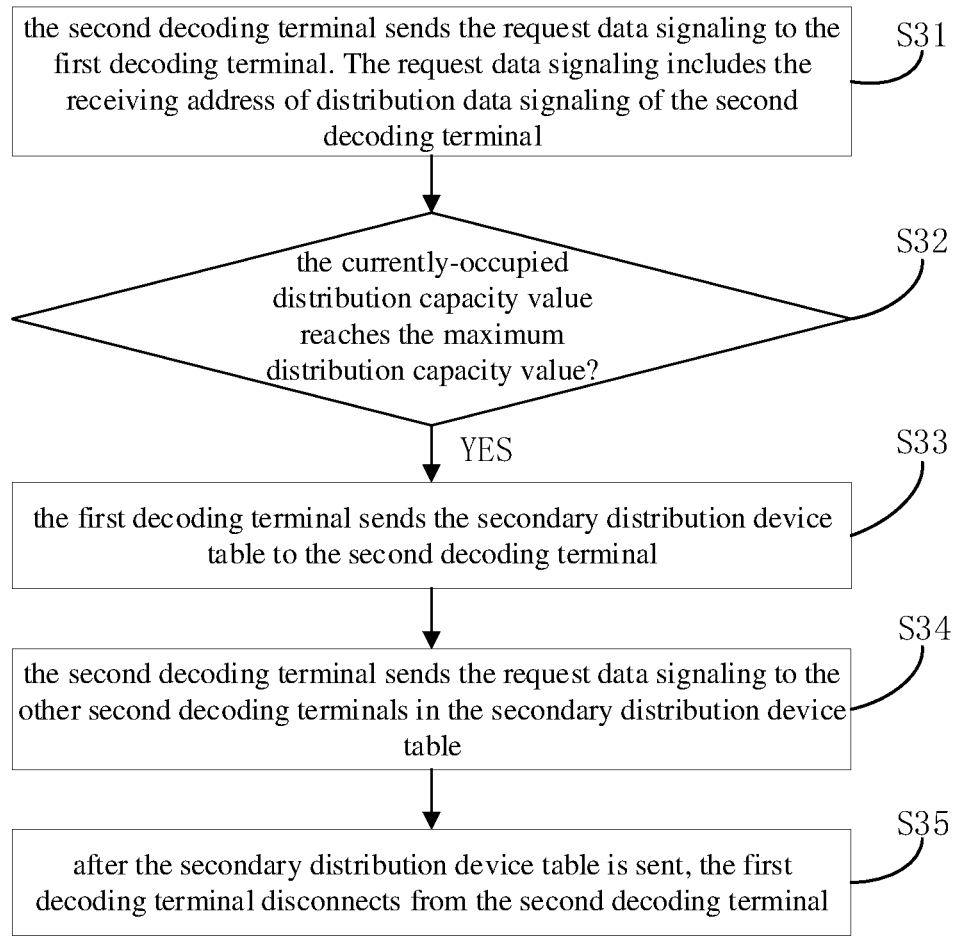
FIG. 3 is a flow chart of a data transmission method according to still another embodiment of the present disclosure.

FIG. 3 is a flow chart of a data transmission method according to still another embodiment of the present disclosure. The data transmission method provided by the present embodiment is applied to the network audio/video matrix system, and the system and functions may be referred to the system architecture disclosed in the above embodiments and will not be repeated herein.

As shown in FIG. 3, the data transmission method includes the following operations.

In an operation S31, the second decoding terminal sends the request data signaling to the first decoding terminal. The request data signaling includes the receiving address of distribution data signaling of the second decoding terminal.

In an operation S32, the first decoding terminal determines whether the currently-occupied distribution capacity value reaches the maximum distribution capacity value.

In an operation S33, the first decoding terminal sends the secondary distribution device table to the second decoding terminal.

In an operation S34, the second decoding terminal sends the request data signaling to the other second decoding terminals in the secondary distribution device table.

In an operation S35, after the secondary distribution device table is sent, the first decoding terminal disconnects from the second decoding terminal.

To be noted that, operations of S31 to S35 are described in the above embodiments and will not be repeated herein.

The above embodiments show only some common examples of the present disclosure, do not limit the scope of the present disclosure. Any minor modifications, equivalent changes or modifications made to the above content based on the technical solutions of the present disclosure shall fall within the scope of the present disclosure.

Figure 4:
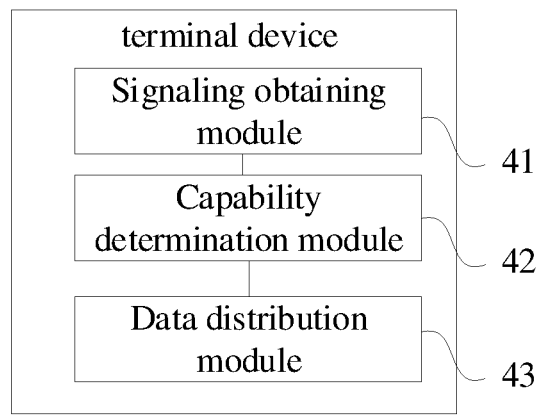
FIG. 4 a structural schematic view of a terminal device according to an embodiment of the present disclosure.

FIG. 4 a structural schematic view of a terminal device according to an embodiment of the present disclosure. The terminal device in the present embodiment is a data distribution device, such as the decoding terminal, which includes the data distribution program module, as described in the above embodiments of the data transmission method.

The terminal device 40 includes a signaling obtaining module 41, a capability determination module 42, and a data distribution module 43.

The signaling obtaining module 41 is configured to acquire the request data signaling from the secondary decoding terminal. The request data signaling includes the receiving address of distribution data signaling of the secondary decoding terminal.

The capacity determination module 42 is configured to determine whether the currently-occupied distribution capacity value reaches the maximum distribution capacity value.

The data distribution module 43 is configured to sending the secondary distribution device table to the secondary decoding terminal when the currently-occupied distribution capacity value reaches the maximum distribution capacity value to enable the secondary decoding terminal to send the request data signaling to other secondary decoding terminals in the secondary distribution device table. After the secondary distribution device table is sent, the data distribution module 43 is configured to be disconnected from the secondary decoding terminal.

Figure 5:
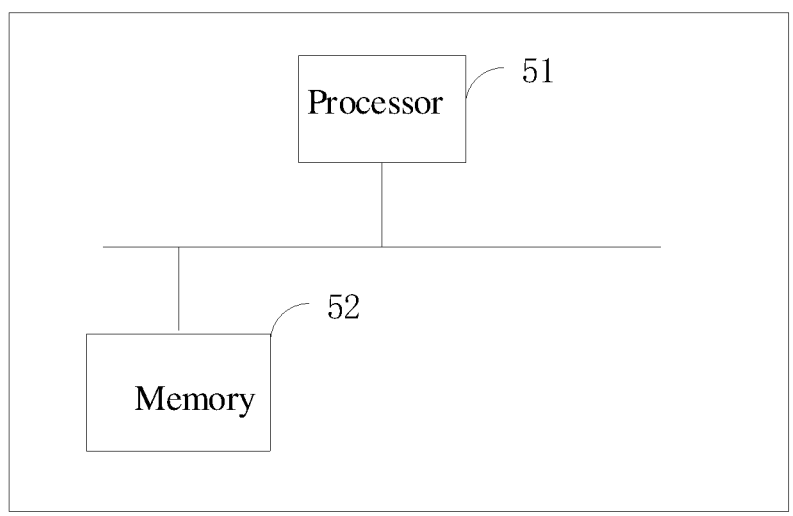
FIG. 5 a structural schematic view of a terminal device according to another embodiment of the present disclosure.

FIG. 5 is a structural schematic view of a terminal device according to another embodiment of the present disclosure. The terminal device includes a memory 52 and a processor 51 connected to the memory 52.

The memory 52 is configured to store program instructions for performing the data transmission method as described in any of the above embodiments.

The processor 51 is configured to execute the program instructions stored in the memory 52.

The processor 51 may be referred to as a central processing unit (CPU). The processor 51 may be an integrated circuit chip having signaling processing capabilities. The processor 51 may alternatively be a general-purpose processor, a digital signaling processor (DSP), an application-specific integrated circuit (ASIC), a field programmable gate array (FPGA) or other programmable logic device, a discrete gate or transistor logic device, a discrete hardware component. The general-purpose processor may be a microprocessor or any conventional processor, and so on.

The memory 52 may be a memory stick, a TF card, and so on, which may store all information in the terminal device, including input raw data, computer programs, intermediate running results, and the final running results. The memory 52 saves and removes information at a location specified by a controller. With the memory, the terminal device has a memory function to ensure normal operation. The memory of the string matching prediction device, based on usage of the memory, may include a main memory and an auxiliary memory or may include an external memory and an internal memory. The external memory may be magnetic media or optical discs, and so on, which stores information for a long time. The internal memory refers to storage components on a motherboard and is configured to store data and programs that are currently executed. The internal memory is configured to temporarily store programs and data, and data may be lost when the power is turned off or cut off.

In the embodiments provided in the present disclosure, it should be understood that the methods and devices disclosed, may be implemented in other ways. For example, the above-described implementations of the devices are merely schematic. For example, modules or units are divided merely based on logical functions. In practice, disclosure may be divided in other ways. For example, a plurality of units or components may be combined or may be integrated into another system, or some features may be omitted or not implemented. In addition, mutual coupling or direct coupling or communicative connection as shown or discussed in the above may be indirect coupling or communicative connection through some interfaces, devices or units, and the coupling may be electrical, mechanical or otherwise.

The units that are illustrated as separated components may or may not be physically separated. Components shown as units may or may not be physical units. That is, the components may be located at one place or distributed over a plurality of network units. Some or all of these units may be selected to achieve the purpose of the present disclosure based on practical needs.

In addition, the functional units in various embodiments of the present disclosure may be integrated in a single processing unit, or each unit may independently physically exist, or two or more units may be integrated in a single unit. The above integrated units may be implemented either in the form of hardware or in the form of software functional units.

The integrated unit may be stored in a computer-readable storage medium when being implemented as a software functional unit and sold or used as a stand-alone product. Based on this understanding, the essence or a part of the technical solution of the present disclosure that contributes to the art or the whole or a part of the technical solution is achieved in the form of a software product. The software product stored in a storage medium. The storage medium includes instructions to cause a computer device (which may be a personal computer, a system server, or a network device, and so on) or a processor to perform all or part of the methods of the various embodiments of the present disclosure.

Figure 6:
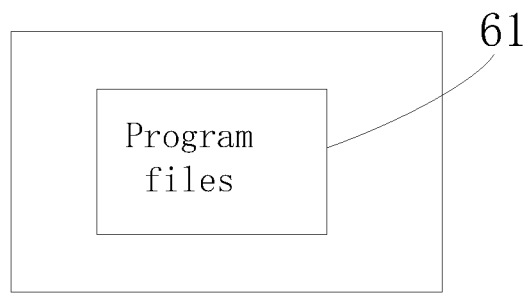
FIG. 6 a structural schematic view of a computer-readable storage medium according to an embodiment of the present disclosure.

FIG. 6 is a structural schematic view of a computer-readable storage medium according to an embodiment of the present disclosure. The storage medium of the present disclosure stores a program file 61 capable of implementing all of the above-described data transmission methods. The program file 61 may be stored in the storage medium in the form of a software product including a number of instructions to cause a computer device (which may be a personal computer, a server or a network device, and so on) or a processor to perform all or some of the steps of the methods of each embodiment of the present disclosure. The aforementioned storage medium includes a USB flash drive, a removable hard drive, a read-only memory (ROM), a random access memory (RAM), a magnetic disk or an optical disk, and other media that can store program codes, or a terminal device such as a computer, a server, a mobile phone, a tablet, and so on.

The above shows only embodiments of the present disclosure, and is not intended to limit the scope of the present disclosure. Any equivalent structure or equivalent process transformations made based on the contents of the specification and the accompanying drawings of the present disclosure, directly or indirectly applied in other fields, shall be equivalently included in the scope of the present disclosure.

What is claimed is:

1. A data transmission method, performed by a decoding terminal in a network audio/video matrix system, wherein the decoding terminal has network connection with to an encoding terminal and a plurality of secondary decoding terminals, and the data transmission method comprises:

obtaining, by the decoding terminal, a request data signaling sent from at least one of the plurality of secondary decoding terminals, wherein the request data signaling comprises a receiving address of a distribution data signaling of the at least one of the plurality of secondary decoding terminals;

determining, by the decoding terminal, whether a currently-occupied distribution capacity value reaches a maximum distribution capacity value; and sending, by the decoding terminal, a secondary distribution device table to the at least one of the plurality of secondary decoding terminals, in response to the currently-occupied distribution capacity value reaching the maximum distribution capacity value, to enable the at least one of the plurality of secondary decoding terminals to send the request data signaling to other secondary decoding terminals in the secondary distribution device table; and disconnecting, after sending the secondary distribution device table, the network connection with the plurality of secondary decoding terminals.

2. The data transmission method according to claim 1, further comprising:

maintaining, by the decoding terminal, the network connection with the plurality of secondary decoding terminals, in response to the currently-occupied distribution capacity value not reaching the maximum distribution capacity value, and distributing audio/video data;

adding, by the decoding terminal, the receiving address of the distribution data signaling of the at least one of the plurality of secondary decoding terminals to the secondary distribution device table.

3. The data transmission method according to claim 1, wherein after the obtaining a request data signaling sent from at least one of the plurality of secondary decoding terminal, the method further comprises:

determining, by the decoding terminal, whether the decoding terminal is currently in a state of being about to terminate a distribution service;

disconnecting, by the decoding terminal, the network connection with the plurality of secondary decoding terminals, in response to the decoding terminal being currently in the state of being about to terminate the distribution service; and determining, by the decoding terminal, whether the currently-occupied distribution capacity value reaches the maximum distribution capacity value, in response to the decoding terminal being not in the state of being about to terminate the distribution service.

4. The data transmission method according to claim 1, further comprising:

obtaining, by the decoding terminal, a signaling of requesting to terminate data distribution sent from the at least one of the plurality of secondary decoding terminals;

searching, by the decoding terminal in the secondary distribution device table, the receiving address of the distribution data signaling of the at least one of the plurality of secondary decoding terminals; deleting, by the decoding terminal, the found receiving address from the secondary distribution device table; and stopping, by the decoding terminal, distributing the audio/video data to the at least one of the plurality of secondary decoding terminals and disconnecting the network connection with the plurality of secondary decoding terminals.

5. The data transmission method according to claim 1, further comprising:

obtaining, by the decoding terminal, a source switching signaling and obtaining a data request address of another encoding terminal from the source switching signaling;

sending, by the decoding terminal, a signaling of changing distribution device to all of the secondary decoding terminals in the secondary distribution device table to enable all of the secondary decoding terminals to switch a decoding terminal that distributes the audio/video data;

sending, by the decoding terminal, a signaling of terminating data connection to the encoding terminal that is currently connected to the decoding terminal; and disconnecting network connection with the encoding terminal;

sending, by the decoding terminal, the request data signaling to the another encoding terminal based on the data request address of the another encoding terminal to receive the audio/video data from the another encoding terminal.

6. The data transmission method according to claim 5, further comprising:

sending the request data signaling to the another encoding terminal based on the data request address of the another encoding terminal;

determining whether an answer from the another encoding terminal is an answer of data being requested successfully;

maintaining, in response to the answer from the another encoding terminal being that the data is requested successfully, network connection with the another encoding terminal and starting receiving the audio/video data sent from the another encoding terminal;

obtaining, in response to the answer from the another encoding terminal being not that the data is requested successfully, a receiving address of a distribution data signaling of an available decoding terminal from the answer sent from the another encoding terminal; and sending the request data signaling to the available decoding terminal based on the receiving address of the distribution data signaling.

7. The data transmission method according to claim 5, further comprising:

obtaining audio/video data from the encoding terminal and obtaining another audio/video data from the another encoding terminal;

determining whether time of the audio/video data is aligned with time of the other audio/video data;

sending, in response to the time of the audio/video data being aligned with the time of the other audio/video data, the signaling of terminating data connection to the encoding terminal and disconnecting data distribution network connection with the encoding terminal;

receiving the audio/video data from the another encoding terminal.

8. A data transmission method, applied to a network audio/video matrix system, wherein the network audio/video matrix system comprises an encoding terminal, a plurality of first decoding terminals and a plurality of second decoding terminals that are communicatively connected to each other; and the data transmission method comprises:

sending, by at least one of the plurality of second decoding terminals, a request data signaling to at least one of the plurality of first decoding terminals, wherein the request data signaling comprises a receiving address of a distribution data signaling of the at least one of the plurality of secondary decoding terminals;

determining, by the at least one of the plurality of first decoding terminals, whether a currently-occupied distribution capacity value reaches a maximum distribution capacity value; and sending, by the at least one of the plurality of first decoding terminals, a secondary distribution device table to the at least one of the plurality of secondary decoding terminals, in response to the currently-occupied distribution capacity value reaching the maximum distribution capacity value;

sending, by the at least one of the plurality of secondary decoding terminals, the request data signaling to other secondary decoding terminals in the secondary distribution device table; and after sending the secondary distribution device table, disconnecting, by the plurality of first decoding terminals, network connection with the plurality of secondary decoding terminals.

9. A terminal device, comprising a processor and a memory connected to the processor, wherein,
the memory stores program instructions;
the processor is configured to execute the program instructions stored in the memory to perform:
obtaining a request data signaling sent from a secondary decoding terminal, wherein the request data signaling comprises a receiving address of a distribution data signaling of the secondary decoding terminal;
determining whether a currently-occupied distribution capacity value reaches a maximum distribution capacity value; and
sending a secondary distribution device table to the secondary decoding terminal, in response to the currently-occupied distribution capacity value reaching the maximum distribution capacity value, to enable the secondary decoding terminal to send the request data signaling to other secondary decoding terminals in the secondary distribution device table;
and disconnecting, after sending the secondary distribution device table, network connection with the secondary decoding terminal.

10. The terminal device according to claim 9, wherein the processor is configured to execute the program instructions to further perform:
maintaining the network connection with the secondary decoding terminal, in response to the currently-occupied distribution capacity value not reaching the maximum distribution capacity value, and distributing audio/video data;
adding the receiving address of the distribution data signaling of the secondary decoding terminal to the secondary distribution device table.

11. The terminal device according to claim 9, wherein after obtaining the request data signaling sent from the secondary decoding terminal, the processor is configured to execute the program instructions to further perform:
determining whether the terminal device is currently in a state of being about to terminate a distribution service;
disconnecting the network connection with the secondary decoding terminal, in response to the terminal device being currently in the state of being about to terminate the distribution service; and
determining whether the currently-occupied distribution capacity value reaches the maximum distribution capacity value, in response to the terminal device being not in the state of being about to terminate the distribution service.

12. The terminal device according to claim 9, wherein the processor is configured to execute the program instructions to further perform:
obtaining a signaling of requesting to terminate data distribution sent from the secondary decoding terminal;
searching, in the secondary distribution device table, the receiving address of the distribution data signaling of the secondary decoding terminal; deleting the found receiving address from the secondary distribution device table; and
stopping distributing the audio/video data to the secondary decoding terminal and disconnecting the network connection with the secondary decoding terminal.

13. The terminal device according to claim 9, wherein the processor is configured to execute the program instructions to further perform:
obtaining a source switching signaling and obtaining a data request address of another encoding terminal from the source switching signaling;
sending a signaling of changing distribution device to all of the secondary decoding terminals in the secondary distribution device table to enable all of the secondary decoding terminals to switch a decoding terminal that distributes the audio/video data;
sending a signaling of terminating data connection to an encoding terminal that is currently connected to the terminal device; and disconnecting network connection with the encoding terminal;
sending the request data signaling to the another encoding terminal based on the data request address of the another encoding terminal to receive the audio/video data from the another encoding terminal.

14. The terminal device according to claim 13, wherein the processor is configured to execute the program instructions to further perform:
sending the request data signaling to the another encoding terminal based on the data request address of the another encoding terminal;
determining whether an answer from the another encoding terminal is an answer of data being requested successfully;
maintaining, in response to the answer from the another encoding terminal being that the data is requested successfully, network connection with the another encoding terminal and starting receiving the audio/video data sent from the another encoding terminal;
obtaining, in response to the answer from the another encoding terminal being not that the data is requested successfully, a receiving address of a distribution data signaling of an available decoding terminal from the answer sent from the another encoding terminal; and
sending the request data signaling to the available decoding terminal based on the receiving address of the distribution data signaling.

15. The terminal device according to claim 13, wherein the processor is configured to execute the program instructions to further perform:
obtaining audio/video data from the encoding terminal and obtaining another audio/video data from the another encoding terminal;

determining whether time of the audio/video data is aligned with time of the another audio/video data;

sending, in response to the time of the audio/video data being aligned with the time of the another audio/video data, the signaling of terminating data connection to the encoding terminal and disconnecting data distribution network connection with the encoding terminal;

receiving the audio/video data from the another encoding terminal.

\* \* \* \* \*